United States Patent
Kimmel et al.

(10) Patent No.: US 10,768,423 B2
(45) Date of Patent: Sep. 8, 2020

(54) OPTICAL APPARATUS AND METHOD

(71) Applicant: Nokia Technologies Oy, Espoo (FI)

(72) Inventors: Jyrki Sakari Kimmel, Tampere (FI);
Marja Salmimaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 47 days.

(21) Appl. No.: 15/810,799

(22) Filed: Nov. 13, 2017

(65) Prior Publication Data

US 2018/0143437 A1    May 24, 2018

(30) Foreign Application Priority Data

Nov. 18, 2016 (EP) .................................. 16199431

(51) Int. Cl.
| | |
|---|---|
| *G02B 27/14* | (2006.01) |
| *G02B 27/01* | (2006.01) |
| *F21V 8/00* | (2006.01) |
| *G02B 27/00* | (2006.01) |
| *G02B 27/10* | (2006.01) |
| *G06F 1/16* | (2006.01) |

(52) U.S. Cl.
CPC ....... *G02B 27/0172* (2013.01); *G02B 6/0016* (2013.01); *G02B 6/0035* (2013.01); *G02B 27/0081* (2013.01); *G02B 27/1066* (2013.01); *G06F 1/163* (2013.01); *G02B 2027/0125* (2013.01); *G02B 2027/0136* (2013.01)

(58) Field of Classification Search
CPC ..... G02B 3/10; G02B 5/1814; G02B 27/0172
USPC .......... 359/34, 13, 15, 569, 630; 351/159.41
See application file for complete search history.

(56) References Cited

U.S. PATENT DOCUMENTS

| | | | |
|---|---|---|---|
| 6,577,411 B1 * | 6/2003 | David ...................... G02B 3/10 | 351/159.41 |
| 8,320,032 B2 * | 11/2012 | Levola ................ G02B 5/1814 | 359/13 |
| 8,708,884 B1 * | 4/2014 | Smyth ................... A61M 21/00 | 600/27 |

FOREIGN PATENT DOCUMENTS

| | | |
|---|---|---|
| EP | 3054339 A1 | 8/2016 |
| WO | WO-2016/083800 A1 | 6/2016 |

* cited by examiner

*Primary Examiner* — Audrey Y Chang
(74) *Attorney, Agent, or Firm* — Harrington & Smith

(57) ABSTRACT

An apparatus and a method are provided. An apparatus, including a first display arrangement; an exit pupil expanding light guide arrangement including an in-coupling region and an out-coupling region, the in-coupling region being configured to in-couple first light from the first display arrangement, and the out-coupling region being configured to out-couple the first light towards a user; and a second display arrangement arranged to transmit second light, through the exit pupil expanding light guide arrangement at the out-coupling region, towards the user.

13 Claims, 8 Drawing Sheets

OPTICAL APPARATUS AND METHOD

TECHNOLOGICAL FIELD

Embodiments of the present invention relate to an optical apparatus and method. In particular, they relate to an optical apparatus and method for a head mounted display apparatus.

BACKGROUND

A head-mounted display apparatus may enable a user to experience virtual reality. In virtual reality, a user visually experiences a virtual environment. The virtual environment may be fully or partially computer-generated. Alternatively or additionally, it may include video that has been recorded of the real world.

BRIEF SUMMARY

According to various, but not necessarily all, embodiments of the invention there is provided an apparatus, comprising: a first display arrangement; an exit pupil expanding light guide arrangement comprising an in-coupling region and an out-coupling region, the in-coupling region being configured to in-couple first light from the first display arrangement, and the out-coupling region being configured to out-couple the first light towards a user; and a second display arrangement arranged to transmit second light, through the exit pupil expanding light guide arrangement at the out-coupling region, towards the user.

The apparatus may, for example, be an optical apparatus.

According to various, but not necessarily all, embodiments of the invention there is provided a method, comprising: coupling first light from a first display arrangement into an exit pupil expanding light guide arrangement using an in-coupling region of the exit pupil expanding light guide arrangement; coupling the first light out of the exit pupil expanding light guide arrangement and towards a user using an out-coupling region of the exit pupil expanding light guide arrangement; and transmitting, by a second display arrangement, second light through the exit pupil expanding light guide arrangement, at the out-coupling region, towards the user.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Embodiments of the invention relate to an apparatus 10, 11 and method. One example of the apparatus 11 may, for example, be a head mounted display apparatus. In embodiments of the invention, light from different display arrangements 21-23 is combined and conveyed to a user, enabling additional information to be conveyed to a user by one display arrangement 22, 23 while primary content is being conveyed to a user by another display arrangement 21.

Figure 1:
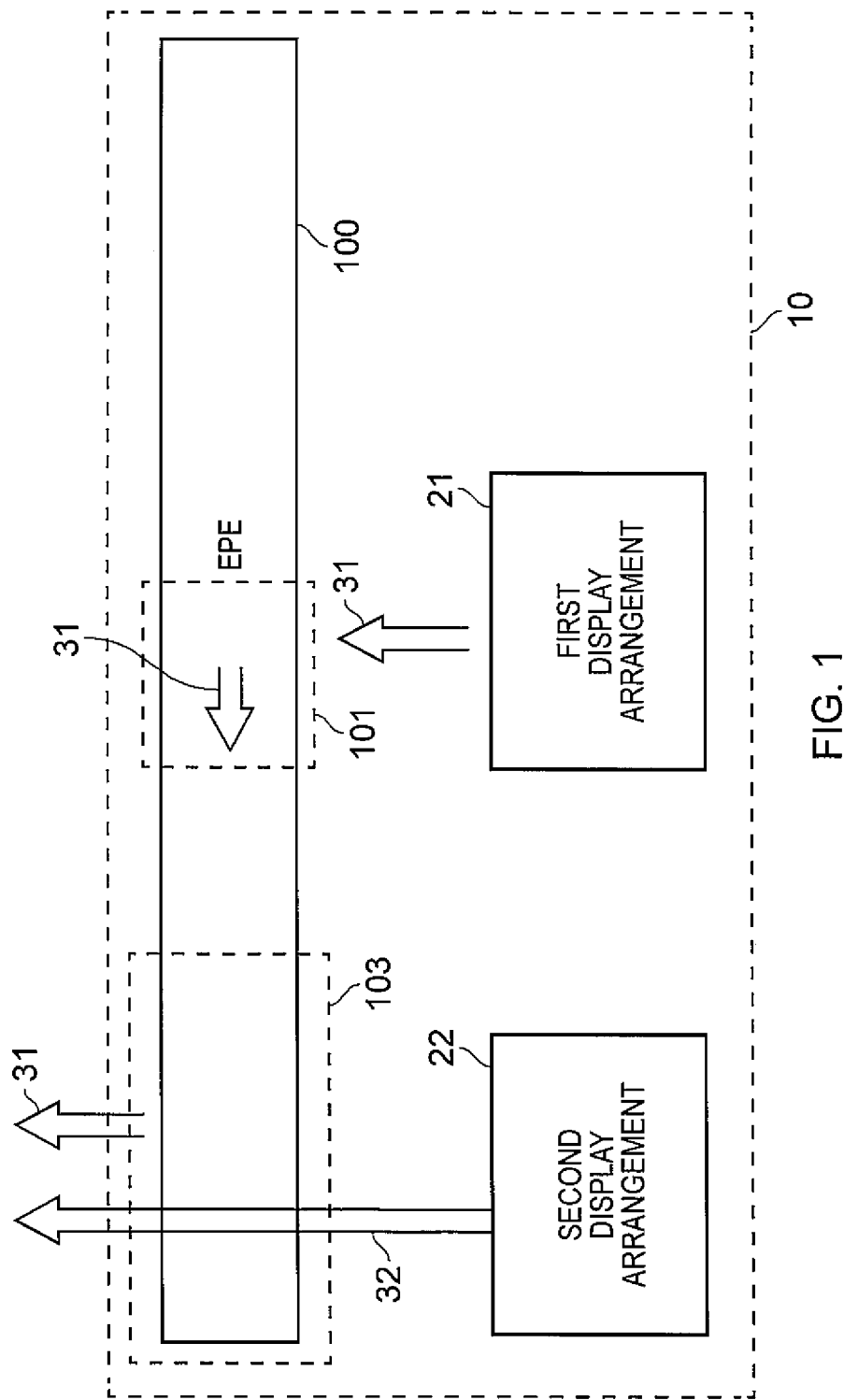
FIG. 1 illustrates a schematic of a first apparatus.

FIG. 1 illustrates a schematic of a first apparatus 10. In the illustrated example, the apparatus 10 comprises a first display arrangement 21, a second display arrangement 22 and an exit pupil expanding light guide arrangement 100.

In some embodiments, the first and second display arrangements 21, 22 are (or comprise) different display devices. In other examples, one display device may provide both of the display arrangements 21, 22.

The exit pupil expanding light guide arrangement 100 may otherwise be known as an exit pupil expander or an exit pupil extender (in both cases, abbreviated as "EPE"). The EPE 100 comprises an in-coupling region 101 and an out-coupling region 103. The in-coupling region 101 is configured to in-couple first light 31 from the first display arrangement 21. The out-coupling region 103 is configured to out-couple the first light 31 towards a user. The first light 31 is guided by the EPE 100 from the in-coupling region 101 to the out-coupling region 103.

The second display arrangement 22 is arranged to transmit second light 32, through the EPE 100 at the out-coupling region 103, towards the user.

The elements 21, 22, 100 are operationally coupled in an optical sense and any number or combination of intervening elements can exist between the elements 21, 22, 100 (including no intervening elements).

Figure 2:
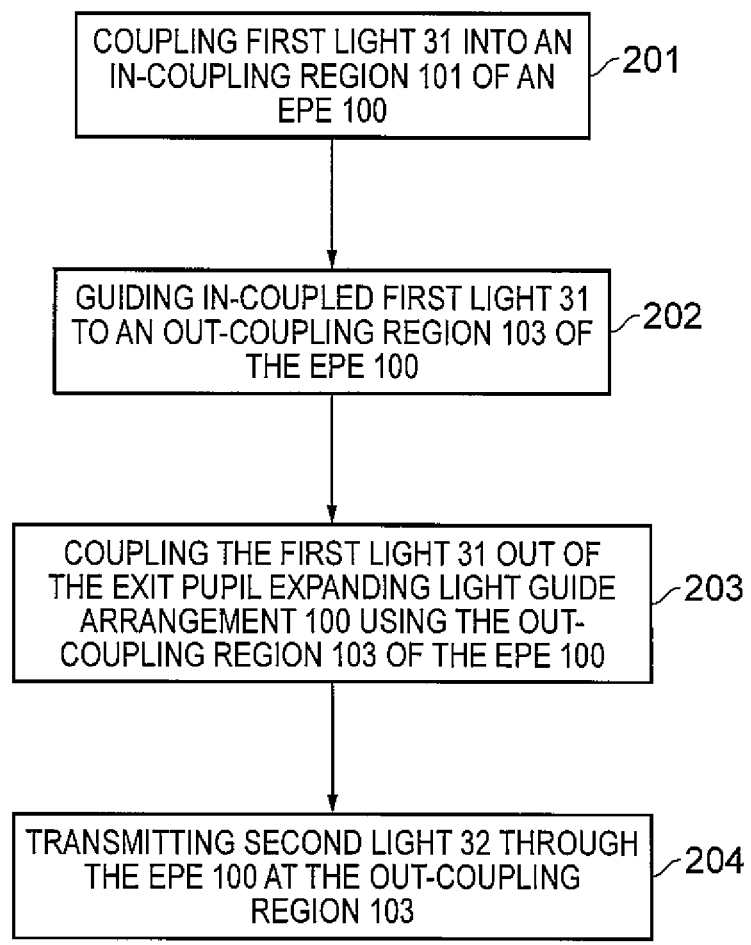
FIG. 2 illustrates a flow chart of a method.

FIG. 2 illustrates a flow chart of a method that is performed by the first apparatus 10. At block 201 in FIG. 2, the in-coupling region 101 of the EPE 100 couples first light 31 from the first display arrangement 21 into the EPE 100. At block 202 in FIG. 2, the in-coupled first light 31 is guided towards the out-coupling region 103 of the EPE 100.

At block 203 in FIG. 2, the first light 31 is out-coupled from the EPE 100 using the out-coupling region 103. The out-coupled first light 31 is directed towards a user. At block 204 in FIG. 2, second light 32 is transmitted through the EPE 100 at the out-coupling region 103, towards the user. Blocks 203 and 204 in FIG. 2 may be performed simultaneously.

Figure 3:
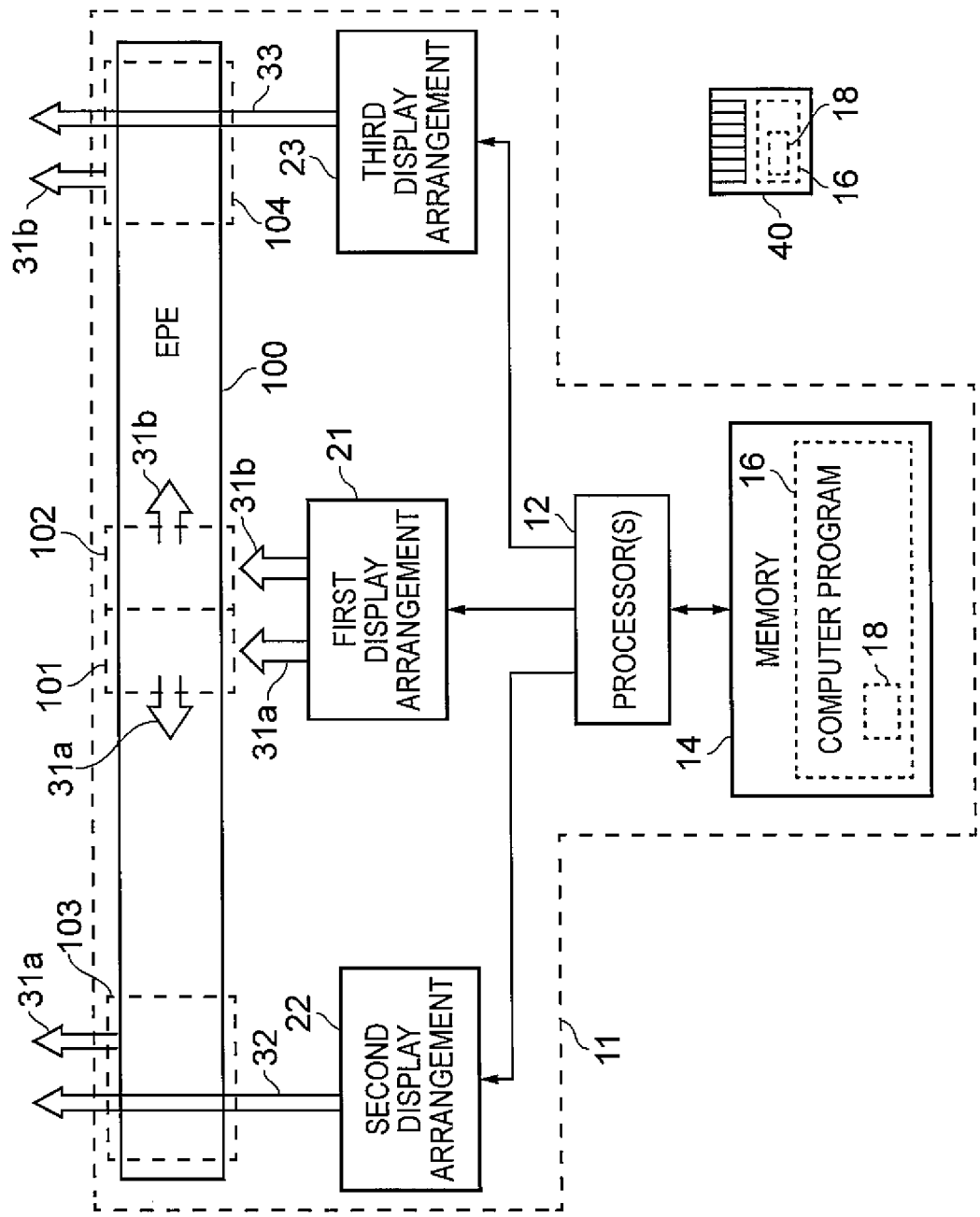
FIG. 3 illustrates a schematic of a second apparatus that comprises the first apparatus.

FIG. 3 illustrates a second apparatus 11 that has the features of the first apparatus 10, along with some additional features. The features of the second apparatus 11 which correspond with those of the first apparatus 10 are denoted with the same reference numerals. The second apparatus 11 provides the functionality of the first apparatus 10, along with some additional functionality. The second apparatus 11 may, for example, be a head mounted display apparatus. The head mounted display apparatus may enable a user to experience virtual reality.

The illustrated second apparatus 11 comprises the first apparatus 10 illustrated in FIG. 1 and also a processor 12, a memory 14 and a third display arrangement 23.

The elements 12, 14, 21, 22, 23, 100 are operationally coupled in an electrical or optical sense and any number or combination of intervening elements can exist between the elements 12, 14, 21, 22, 23, 100 (including no intervening elements).

In some embodiments, each display arrangement 21-23 is a different display device. Some or all of the display arrangements 21-23 may each comprise multiple display devices. Alternatively or additionally, one display device may provide all or some of the display arrangements 21-23.

Each of the first display arrangement 21, the second display arrangement 22 and the third display arrangement 23 may each comprise one or more display panels having an array of pixels, or a portion of a display panel having an array of pixels. The array of pixels may, for example, be arranged in columns and rows.

If the first display arrangement 21 is or comprises a different display device from the second and/or third display arrangement(s) 22, 23, the display panel of the first display arrangement 21 is different from the display panel(s) of the second and/or third display arrangement(s) 22, 23. In such embodiments, the first display arrangement 21 might comprise a display panel of a high resolution, such as a display having a resolution of 1280×720 or greater. Either or both the second display arrangement 22 and the third display arrangement 23 may have a (much) lower resolution.

For instance, the first display arrangement 21 may comprise a high resolution (active matrix) organic light emitting diode (AM)OLED display panel, a high resolution liquid crystal display (LCD) panel, a high resolution quantum dot display panel, a liquid crystal on silicon (LCoS) display or another type of high resolution display panel. An (AM) OLED display panel is an example of a self-illuminating display panel. An LCD panel is, on the other hand, illuminated by an external source such as a backlight and/or sunlight.

Each of the second display arrangement 22 and the third display arrangement 23 may, for example, comprise a pixel array of light emitting diodes (LEDs). Each pixel might comprise a single LED or a cluster of differently colored LEDs such as red, blue and green (RGB) LEDs. The pixel array might have a resolution which is less than 10% of that of display panel of the first display arrangement 21. It could be less than 5% of that of display panel of the first display arrangement 21. For instance, it might be a 16×9 array or a 32×18 array if it has a 16:9 aspect ratio.

The aspect ratio of each of the second and third display arrangements 22, 23 may be the same as the aspect ratio of the first display arrangement 21, or different.

If the second and/or third display arrangement 22, 23 forms part of the same display device as the first display arrangement 21, the resolution of the each of the display arrangements 21-23 might be the same or different. In some embodiments, at least a portion of the first, second and third display arrangements 21, 22, 23 may be provided by a single (AM)OLED display panel.

In FIG. 3, the EPE 100 provided in the second apparatus 11 comprises a first in-coupling region 101, a second in-coupling region 102, a first out-coupling region 103 and a second out-coupling 104. The EPE 100 may be a single plate.

The first in-coupling region 101 is configured to in-couple a first portion 31a of first light 31 from the first display arrangement 21 into the EPE 100. The first out-coupling region 103 is configured to out-couple the first portion 31a of the first light 31 towards a user. The first portion 31a of the first light 31 is guided by the EPE 100 from the first in-coupling region 101 to the first out-coupling region 103.

The second in-coupling region 102 is configured to in-couple a second portion 31b of the first light 31 from the first display arrangement 21 into the EPE 100. The second out-coupling region 104 is configured to out-couple the second portion 31b of the first light 31 towards the user. The second portion 31b of the first light 31 is guided by the EPE 100 from the second in-coupling region 102 to the second out-coupling region 104.

One or both of the first and second in-coupling regions 101, 102 may comprise a diffraction grating for in-coupling the first light 31 from the first display arrangement 21. One or both of the out-coupling regions 103, 104 may comprise a diffraction grating for out-coupling the first light 31 from the EPE 100 and towards a user. Each of the diffraction gratings could be any type of diffraction grating, including a holographic diffraction grating and a surface relief diffraction grating.

The second display arrangement 22 is arranged to transmit second light 32, through the EPE 100 at the first out-coupling region 103, towards the user. The third display arrangement 23 is arranged to transmit third light 32, through the EPE 100 at the second out-coupling region 104, towards the user.

The processor 12 is configured to read from and write to the memory 14. The processor 12 may also comprise an output interface via which data and/or commands are output by the processor 12 and an input interface via which data and/or commands are input to the processor 12.

Although the processor 12 is illustrated as a single component/circuitry it may be implemented as one or more separate components/circuitry some or all of which may be integrated/removable. The processor 12 may be a single-core or multi-core processor.

The memory 14 stores a computer program 16 comprising computer program instructions/code 18 that at least partially control(s) the operation of the second apparatus 11 when loaded into the processor 12. The processor 12 by reading the memory 14 is able to load and execute the computer program 16.

Although the memory 14 is illustrated as a single component/circuitry it may be implemented as one or more separate components/circuitry some or all of which may be integrated/removable and/or may provide permanent/semi-permanent/dynamic/cached storage.

As illustrated in FIG. 3, the computer program 16 may arrive at the apparatus 10 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 16. The delivery mechanism 40 may be a signal configured to reliably transfer the computer program 16. The second apparatus 11 may propagate or transmit the computer program 16 as a computer data signal.

Figure 4:
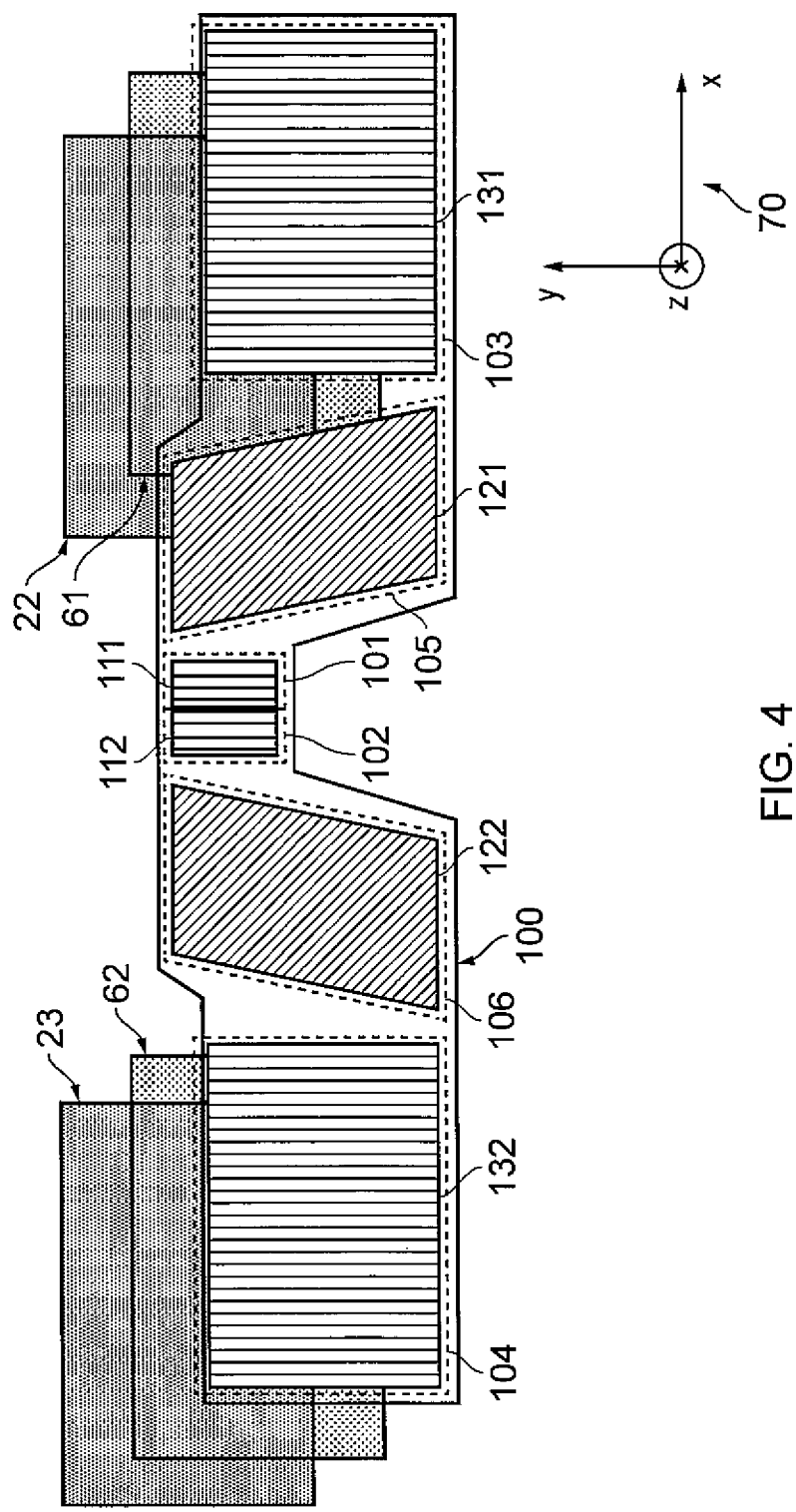
FIG. 4 illustrates a front elevation of an example of at least part of the second apparatus.
Figure 5:
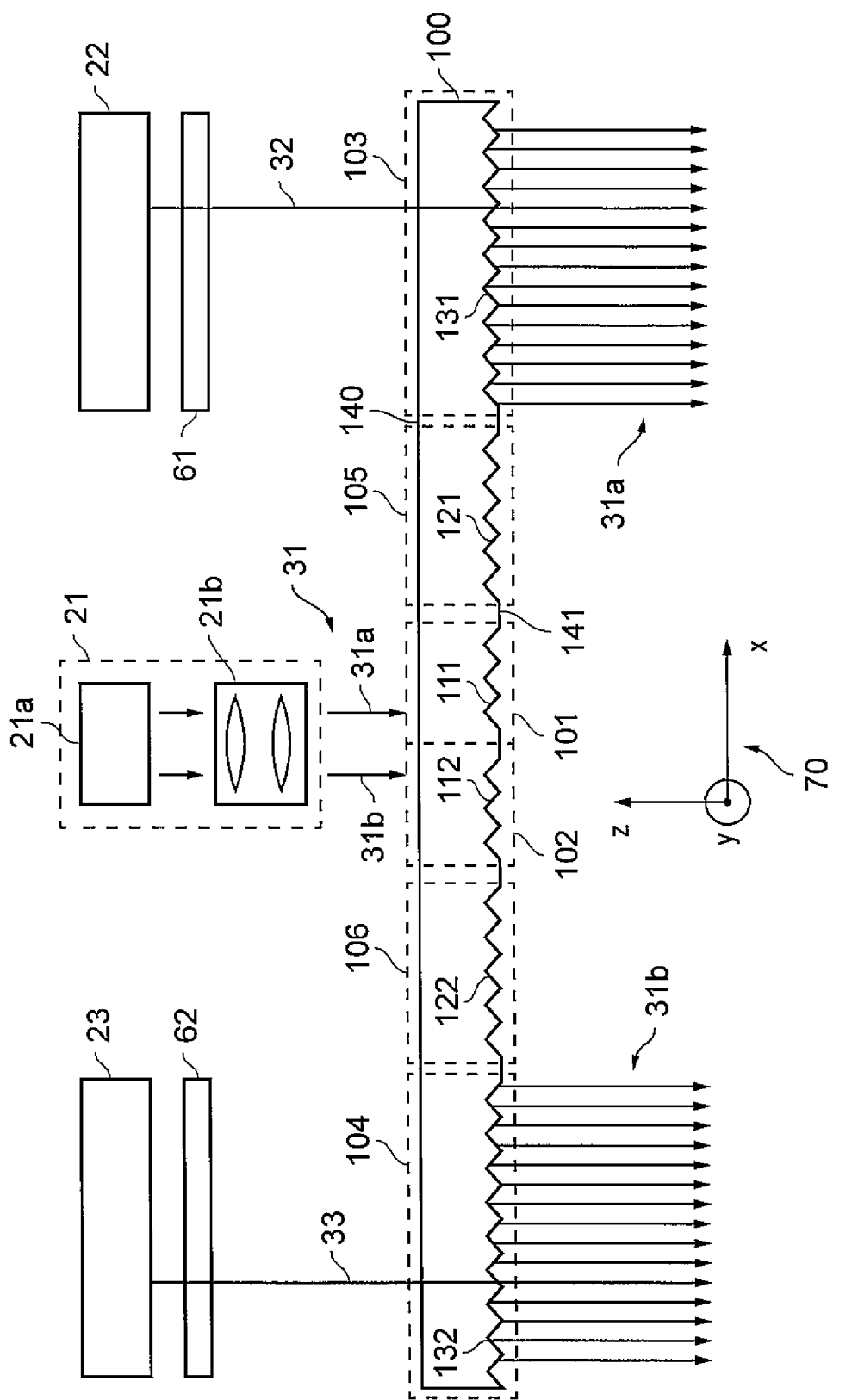
FIG. 5 illustrates a plan view of at least part of the second apparatus.

FIG. 4 illustrates a front elevation of an example of part of the second apparatus 11. FIG. 5 illustrates a plan view of part of the second apparatus 11. FIG. 4 differs from FIG. 5 in that the first display arrangement 21 has been removed from FIG. 4 for clarity.

Cartesian co-ordinate axes 70 are provided in FIGS. 4 and 5 to help the reader to orientate FIGS. 4 and 5 relative to each other. The Cartesian co-ordinate axes 70 define orthogonal x, y and z dimensions/axes. The z-axis extends into the page in FIG. 4. The y axis extends out of the page in FIG. 5. The example of the second apparatus 11 illustrated in FIGS. 4 and 5 includes some features in addition to those illustrated in FIG. 3.

In addition to the first in-coupling region 101, the second in-coupling region 102, the first out-coupling region 103 and the second out-coupling region 104, the EPE 100 illustrated in FIGS. 4 and 5 comprises a first light expanding region 105 and a second light expanding region 106.

The example of the second apparatus 11 illustrated in FIGS. 4 and 5 comprises optional first and second polarizers 61, 62. The first polarizer 61 is positioned between the first out-coupling region 103 of the EPE 100 and the second display arrangement 22, such that second light 32 transmitted by the second display arrangement 22 is transmitted through the first polarizer 61 and then through the first out-coupling region 103 of the EPE 100. The purpose of the first polarizer 61 is to block light reflected by an aspect of the second display arrangement 22 and directed towards the first out-coupling region 103 of the EPE 100, such that it cannot pass through the first out-coupling region 103. For example, the first polarizer 61 may be a circular polarizer 61. If light travels through the circular polarizer 61 in the +z direction, the handedness of the polarized light is changed when that light is reflected by an aspect of the second display arrangement 22. The reflected light is then prevented from passing through the circular polarizer 61 when travelling in the reverse, −z, direction.

The second polarizer 62 is positioned between the second out-coupling region 104 of the EPE 100 and the third display arrangement 23, such that third light 33 transmitted by the third display arrangement 23 is transmitted through the second polarizer 62 and then through the second out-coupling region 104 of the EPE 100. The purpose of the second polarizer 62 is to block light reflected by an aspect of the third display arrangement 23 and directed towards the second out-coupling region 104 of the EPE 100, such that it cannot pass through the second out-coupling region 104. For example, the second polarizer 62 may be a circular polarizer 62. If light travels through the circular polarizer 62 in the +z direction, the handedness of the polarized light is changed when that light is reflected by an aspect of the third display arrangement 23. The reflected light is then prevented from passing through the circular polarizer 62 when travelling in the reverse, −z, direction.

FIG. 5 illustrates an example of the first display arrangement 21 which comprises a display panel 21a and an optical arrangement 21b. The optical arrangement 21b may, for example, comprise one or more optical devices for collimating light passing through or transmitted by the display panel 22a, such that first light 31 is transmitted by the first display arrangement 21 towards the first and second in-coupling regions 101, 102 of the EPE 100 is collimated.

In the example illustrated in FIGS. 4 and 5, each of the first in-coupling region 101, the second in-coupling region 102, the first light expanding region 105, the second light expanding region 106, the first out-coupling region 103 and the second out-coupling region 104 comprises a diffraction grating 111, 112, 121, 122, 131, 132.

In FIGS. 4 and 5, the EPE 100 has a length that is aligned with the x dimension, a height/width that is aligned with the y dimension and thickness/depth that is aligned with the z dimension. A first face 140 of the EPE 100, substantially defined in an x-y plane, is separated from a second face 141, also substantially defined in an x-y plane, by the thickness of the EPE 100. In the example illustrated in FIGS. 4 and 5, the diffraction gratings 111, 112 of the first and second in-coupling regions 101, 102 are disposed on the first face 140 of the EPE 100 and the diffraction gratings 121, 122, 131, 132 are disposed on the second face 141 of the EPE 100, but that need not be the case in every example of the EPE 100.

In use, first light 31 is transmitted by the first display arrangement 21 towards the first and second in-coupling regions 101, 102 in the EPE 100, in the −z direction. A first portion 31a of the first light 31 is directed towards the first in-coupling region 101 of the EPE 100 and a second portion 31b of the first light 31 is directed towards the second in-coupling region 102 of the EPE 100.

The first portion 31a of the first light 31 is coupled into the EPE 100 by the diffraction grating 111 of the first in-coupling region 101. The in-coupled first portion 31a of the first light 31 is then guided towards the diffraction grating 121 of the first light expanding region 105 of the EPE 100. In this example, the first portion 31a of the first light 31 travels within the EPE 100 as it travels from the first in-coupling region 101 to the first light expanding region 105. It may, for example, be reflected within the EPE 100 as it travels (for instance, via total internal reflection; TIR). The general direction of travel of the first portion 31a of the first light 31 as it is guided through the EPE 100 from the first in-coupling region 101 to the first light expanding region 105 is in the +x direction.

When the first portion 31a of the first light 31 reaches the diffraction grating 121 of the first light expanding region 105, it is expanded in a first dimension defined by the y-axis and directed towards the first out-coupling portion 103 of the EPE 100. That is, the extent over which the first portion 31a of the first light 31 exits (the diffraction grating 121 of) the first light expanding region 105 region is greater than the extent over which the first portion 31a of the first light 31 is received by (the diffraction grating 121 of) the first light expanding region 105 in the first dimension. The first portion 31a of the first light 31 is effectively being spread in the first dimension.

Upon exiting the first light expanding region 105 of the EPE 100, the first portion 31a of the first light 31 remains within the EPE 100. The first portion 31a of the first light 31 is guided towards the first out-coupling region 103 by the EPE 100. It may, for example, be reflected within the EPE 100 as it travels (for instance, via TIR). The general direction of travel of the first portion 31a of the first light 31 as it is guided through the EPE 100 from the first light expanding region 105 to the first out-coupling region 103 is in the +x direction.

The first portion 31a of the first light 31 then reaches the (diffraction grating 131 of the) first out-coupling region 103. As the light travels within the EPE 100 across the first out-coupling region 103, the light is gradually out-coupled across the diffraction grating 131 of the first out-coupling region 103, expanding/spreading the first portion 31a of the first light 31 in a second dimension aligned with the x-axis. Thus, when the first portion 31a of the first light 31 is out-coupled from the EPE 100 by the first out-coupling region 103, the first portion 31a of the first light 31 has been expanded in the first dimension (aligned with the y-axis) by (the diffraction grating 121 of) the first light expanding region 105 and expanded in the second dimension (aligned with the x-axis) by (the diffraction grating 131 of) the first out-coupling region 103.

The first portion 31a of the first light 31 enters the EPE 100 at the first face 140 and exits the EPE 100 at the second face 141 in the example illustrated in FIGS. 4 and 5. In the illustrated example, when the first portion 31a of the first light 31 exits the EPE 100 at the first out-coupling region 103, it is directed towards a first eye of a user (and not a second eye of the user).

The second portion 31b of the first light 31 is coupled into the EPE 100 by the diffraction grating 112 of the second in-coupling region 102. The in-coupled second portion 31b of the first light 31 is then guided towards the diffraction grating 122 of the second light expanding region 106 of the EPE 100. In this example, the second portion 31b of the first light 31 travels within the EPE 100 as it travels from the second in-coupling region 102 to the second light expanding region 106. It may, for example, be reflected within the EPE 100 as it travels (for instance, via TIR). The general direction of travel of the second portion 31b of the first light 31 as it is guided through the EPE 100 from the second in-coupling region 102 to the second light expanding region 106 is in the −x direction.

When the second portion 31b of the first light 31 reaches the diffraction grating 122 of the second light expanding region 106, it is expanded in the first dimension defined by the y-axis and directed towards the second out-coupling portion 106 of the EPE 100. That is, the extent over which the second portion 31b of the first light 31 exits (the diffraction grating 122 of) the second light expanding region 106 region is greater than the extent over which the second portion 31b of the first light 31 is received by (the diffraction grating 122 of) the second light expanding region 106 in the first dimension. The second portion 31b of the first light 31 is effectively being spread in the first dimension.

Upon exiting the second light expanding region 106 of the EPE 100, the second portion 31b of the first light 31 remains within the EPE 100. The second portion 31b of the first light 31 is guided towards the second out-coupling region 104 by the EPE 100. It may, for example, be reflected within the EPE 100 as it travels (for instance, via TIR). The general direction of travel of the second portion 31b of the first light 31 as it is guided through the EPE 100 from the second light expanding region 106 to the second out-coupling region 104 is in the −x direction.

The second portion 31b of the first light 31 then reaches the (diffraction grating 132 of the) second out-coupling region 104. As the light travels within the EPE 100 across the second out-coupling region 104, the light is gradually out-coupled across the diffraction grating 132 of the second out-coupling region 104, expanding/spreading the second portion 31b of the first light 31 in the second dimension aligned with the x-axis. Thus, when the second portion 31b of the first light 31 is out-coupled from the EPE 100 by the second out-coupling region 104, the second portion 31b of the first light 31 has been expanded in the first dimension (aligned with the y-axis) by (the diffraction grating 122 of) the second light expanding region 106 and expanded in the second dimension (aligned with the x-axis) by (the diffraction grating 132 of) the second out-coupling region 104.

The second portion 31b of the first light 31 enters the EPE 100 at the first face 140 and exits the EPE 100 at the second face 141 in the example illustrated in FIGS. 4 and 5. In the illustrated example, when the second portion 31b of the first light 31 exits the EPE 100 at the second out-coupling region 104, it is directed towards the second eye of the user (and not the first eye of the user).

A display panel of the second display arrangement 22 may be positioned in a plane (an x-y plane in FIGS. 4 and 5) that is substantially parallel to a plane in which the first out-coupling region 103 of the EPE 100 is positioned.

The second light 32 is transmitted by the second display arrangement 22 directly through the first polarizer 61 and directly through the first out-coupling region 103 of the EPE 100. The second light 32 enters the EPE 100 at the first face 140, travels through the EPE 100 and exits the EPE 100 at the second face 141. The first out-coupling region 103 is substantially optically transparent to at least some of the second light 32 transmitted by the second display arrangement 22. For example, light rays transmitted by the second display arrangement 22 may be considered to travel substantially rectilinearly through the EPE 100, in the −z direction.

The second light 32 transmitted by the second display arrangement 22 is coincident with at least some of the first portion 31a of the first light 31 when the first portion 31a of the first light 31 and the second light 32 exit the first out-coupling portion 103 of the EPE 100.

A display panel of the third display arrangement 23 may be positioned in a plane (an x-y plane in FIGS. 4 and 5) that is substantially parallel to a plane in which the second out-coupling region 104 of the EPE 100 is positioned.

The third light 33 is transmitted by the third display arrangement 23 directly through the second polarizer 62 and directly through the second out-coupling region 104 of the EPE 100. The third light 33 enters the EPE 100 at the first face 140, travels through the EPE 100 and exits the EPE 100 at the second face 141. The second out-coupling region 104 is substantially optically transparent to at least some of the third light 33 transmitted by the third display arrangement 23. For example, light rays transmitted by the third display arrangement 33 may be considered to travel substantially rectilinearly through the EPE 100, in the −z direction. The third light 33 transmitted by the third display arrangement 23 is separated from the second light 32 transmitted by the second display arrangement 22 in the second dimension defined by the x-axis.

The third light 33 transmitted by the third display arrangement 23 is coincident with at least some of the second portion 31b of the first light 31 when the second portion 31b of the first light 31 and the third light 33 exit the second out-coupling portion 104 of the EPE 100.

The first portion 31a of the first light 31 forms a virtual image (in an optical sense) for the first eye of the user and the second portion 31b of the first light 31 forms a virtual image (in an optical sense) for the second eye of the user. The virtual images seen by the first and second eyes of the user are expanded in both the first dimension defined by the y-axis and the second dimension defined by the x-axis, relative to the size of the corresponding images that are displayed on the display panel of the first display arrangement 21. The virtual images formed by the first and second portions 31a, 31b of the first light 31 may be in focus for the user.

The second light 32 transmitted through the first out-coupling region 103 of the EPE 100 forms a real image for the first eye of the user. Similarly, the third light 33 transmitted by the third display arrangement 23 through the second out-coupling region 104 of the EPE 100 forms a real image for the second eye of the user. The real images formed by the second light 32 and the third light 33 may be out of focus for the user.

The real image produced by the second light 32 is at least partially coincident with the virtual image produced by the first portion 31a of the first light 31. The real image produced by the third light 33 transmitted by the third display arrangement 23 forms a real image that is at least partially coincident with the virtual image produced by the second portion 31b of the first light 31.

Figure 6:
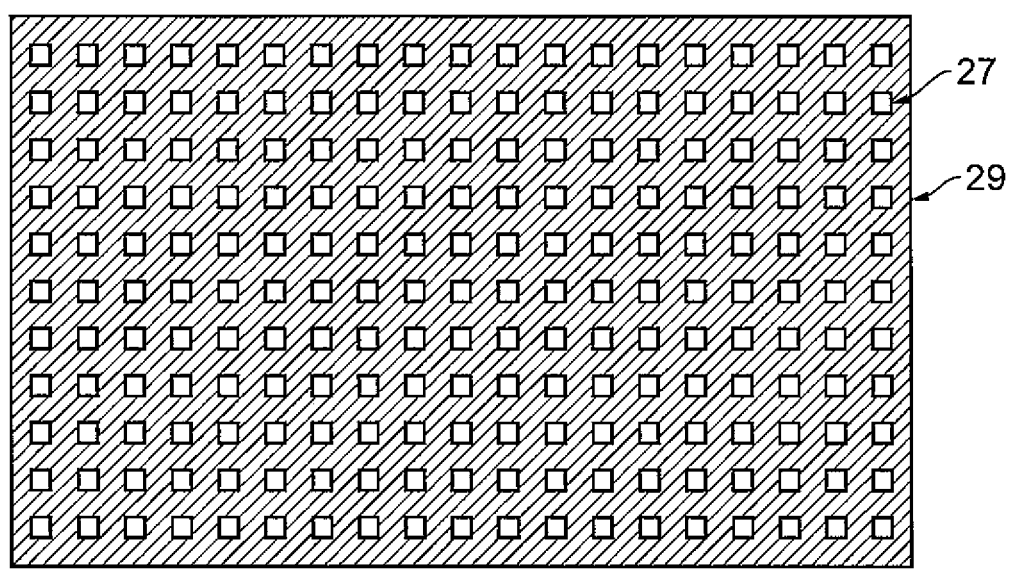
FIG. 6 illustrates a display arrangement.

An example of a display panel 29 that be (or form part of) the second and/or third display arrangements 22, 23 is illustrated in FIG. 6. In the illustrated display panel 29 comprises a pixel array of LED's 27 arranged in rows and columns. As explained above, each pixel may comprise a single LED (such as a white LED) or a cluster of colored LEDs (such as an RGB cluster of LEDs).

In some embodiments of the invention, the first display arrangement 21 may provide the "main display" for displaying first/primary content to the user and the second and/or third display arrangements 22, 23 may display second/secondary content which augments the primary content.

For example, the primary content displayed by the display arrangement 21 could be motion video related to a TV show, movie or a video game. The secondary content displayed by the second and/or third display arrangements 22, 23 could be, for example:
  anti-nausea stimuli;
  added special effects;
  highlighting for navigation applications;
  highlighting for incoming fire and/or the presence of a friend or foe in virtual reality gaming;
  warning lights relating to a user's proximity to real world objects;
  alerts from communication devices or other users, such as text messages, phone calls and/or social media notifications; and
  health-related alerts such those relating to as heart rate, blood pressure galvanometric skin response, etc.

The second and/or third display arrangements 22, 23 could also be used to adjust the hue of colors displayed in the primary content displayed by the first display arrangement 21, which could be context sensitive. For example, the overall color hue displayed to the user could be gradually adjusted towards blue over a period of use, to help to maintain user alertness (for example, if the user is performing cognitive tasks). Alternatively, the overall color hue could be adjusted away from blue in the evening to avoid excessive disturbance of the user's circadian rhythm.

Figure 7A:
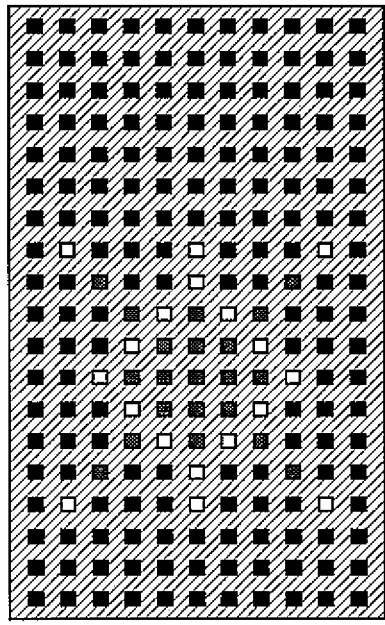
FIGS. 7A and 7B illustrate examples of part of a first display arrangement displaying first content and a second or third display arrangement displaying second content.
Figure 7A:
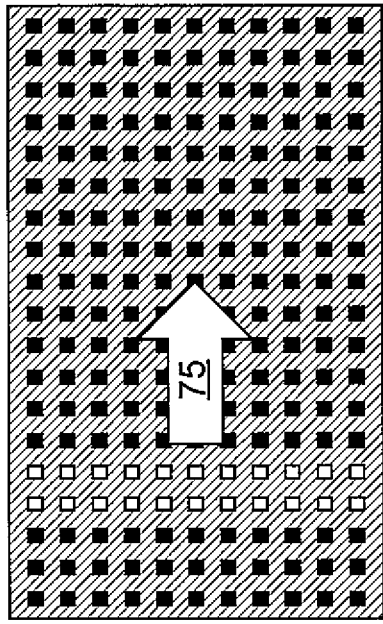
Figure 7B:
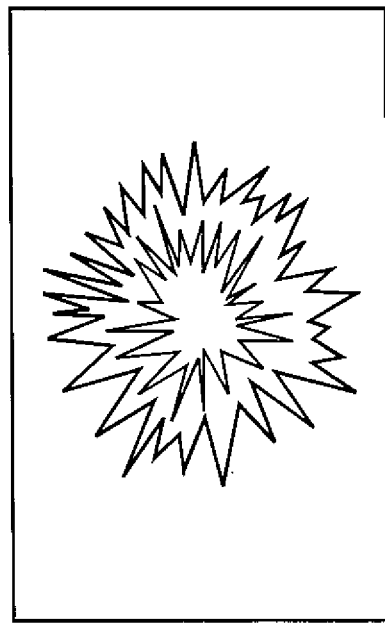
Figure 7B:
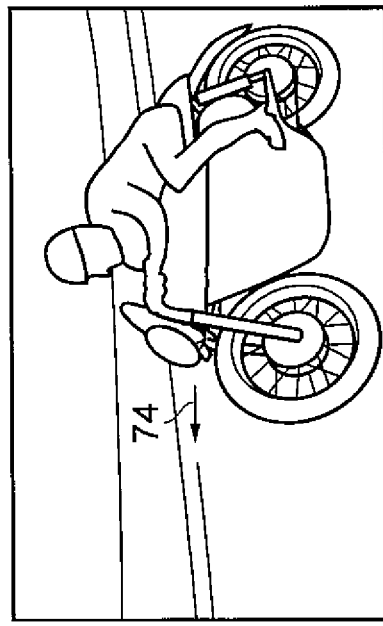

Each of FIG. 7A and FIG. 7B illustrates an example in which at least part of the first display arrangement 21 is displaying first/primary content and the second and/or third display arrangement 22, 23 is displaying second/secondary content to augment the primary content.

In the FIG. 7A example, the second and/or third display arrangement 22, 23 is being used to enhance the contrast of an explosion displayed as part of the primary content, with an LED array being provided to produce secondary content that follows the contour of the explosion in the primary content.

In the FIG. 7B example, an image formed as part of the primary content displayed by the first display arrangement 21 has a movement component in a first direction 74, and an image formed as part of the secondary content displayed by the second and/or third display arrangement(s) 22, 23 has a movement component in a second direction 75, substantially opposite to the first direction 74, helping to alleviate motion sickness symptoms when experiencing virtual reality.

Figure 8:
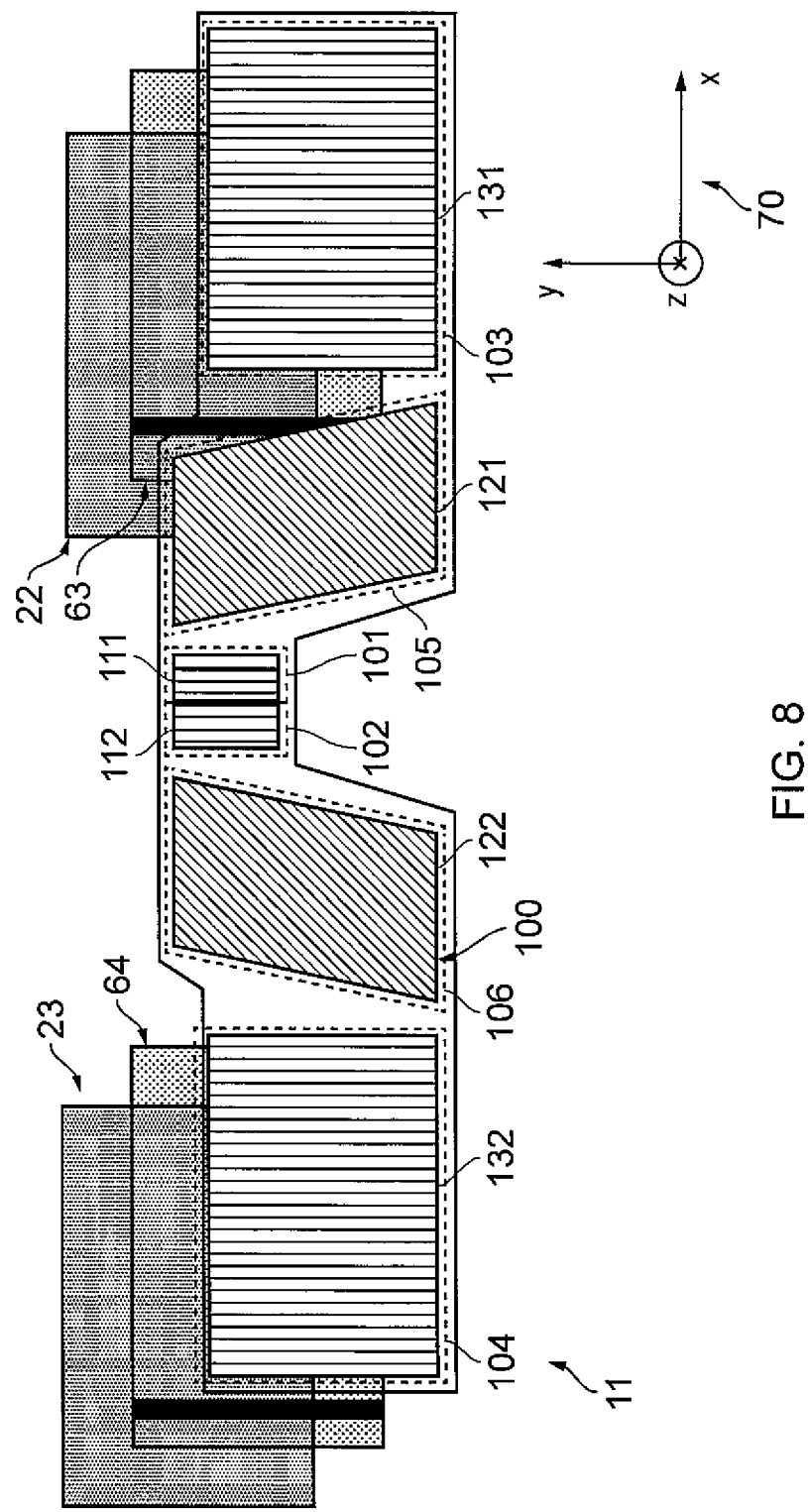
FIG. 8 illustrates a front elevation of a further embodiment of at least part of the second apparatus.

FIG. 8 illustrates a front elevation of a further embodiment of at least part of the second apparatus 11. The z-axis extends into the page in FIG. 8. The embodiment illustrated in FIG. 8 differs from that illustrated in FIGS. 4 and 5 in that the polarizers 61, 62 have been replaced by shutters 63, 64 for blocking light. The shutters 63, 64, could, for example, be liquid crystal display (LCD) shutters.

References to 'computer-readable storage medium', 'computer program product', etc. or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The illustration of a particular order to the blocks in FIG. 2 does not necessarily imply that there is a required or preferred order for the blocks and the order and arrangement of the block may be varied. Furthermore, it may be possible for some blocks to be omitted.

We claim:

1. An apparatus comprising:
   a first display;
   an exit pupil expanding light guide, said exit pupil expanding light guide having an in-coupling region and an out-coupling region, the in-coupling region being disposed at the first display to in-couple primary video content from the first display, and the out-coupling region being disposed to out-couple the primary video content towards an eye of a user;
   a second display disposed at the out-coupling region of the exit pupil expanding light guide to transmit secondary video content, through the exit pupil expanding light guide at the out-coupling region, towards the eye of the user, said second display conveying the secondary video content to coincide in place with and augment the primary video content, said second display including a display panel aligned with the out-coupling region in a plane substantially parallel to the out-coupling region;
   at least one processor; and
   at least one memory including computer program code, wherein the at least one memory and the computer program code are configured, with the at least one processor, to cause the apparatus at least to:
   convey the primary video content to the user from the first display, said primary video content having a movement component in a first direction; and
   convey the secondary video content coinciding in place with and augmenting the primary video content to the user from the second display, the secondary video content having a movement component in a second direction substantially opposite to the first direction,
   whereby motion sickness symptoms caused by the primary video content are alleviated.

2. The apparatus as claimed in claim 1, wherein the second display and the exit pupil expanding light guide are configured such that the secondary video content is coincident with at least some of the primary video content when the primary video content and the secondary video content exit the exit pupil expanding light guide at the out-coupling region.

3. The apparatus as claimed in claim 1, wherein the primary video content forms a virtual image for the user, and the secondary video content forms a real image for the user.

4. The apparatus as claimed in claim 3, wherein the real image is at least partially coincident with the virtual image.

5. The apparatus as claimed in claim 1, wherein out-coupling region is substantially optically transparent to light transmitted by the second display.

6. The apparatus as claimed in claim 1, wherein the in-coupling region comprises at least one in-coupling diffraction grating and the out-coupling region comprises at least one out-coupling diffraction grating.

7. The apparatus as claimed in claim 6, wherein the exit pupil expanding light guide comprises a further diffraction grating configured to expand the first light in a first dimension, and the out-coupling diffraction grating is configured to expand the first light in a second dimension, orthogonal to the first dimension.

8. The apparatus as claimed in claim 1, further comprising:
   a polarizer or a shutter, positioned at least partially between the second display and the out-coupling region, configured to block light reflected from second display and directed towards the out-coupling region.

9. The apparatus as claimed in claim 1, wherein the apparatus is a head-mounted display apparatus.

10. A method comprising:
    conveying primary video content to a user from a first display, the first display being coupled to an in-coupling region of an exit pupil expanding light guide and the user receiving the primary video content at an out-coupling region of the exit pupil expanding light guide, the primary video content having a movement component in a first direction; and
    conveying secondary video content to coincide in place with and to augment the primary video content from a second display, said second display including a display panel aligned with the out-coupling region of the exit pupil expanding light guide in a plane substantially parallel to the out-coupling region, the secondary video content having a movement component in a second direction substantially opposite to the first direction,
    whereby motion sickness symptoms caused by the primary video content are alleviated.

11. The method as claimed in claim 10, wherein the secondary video content is coincident with at least a portion of the primary video content when the primary video content and secondary video content exit the out-coupling region.

12. The method as claimed in claim 10, wherein the primary video content forms a virtual image for the user, and the secondary video content forms a real image for the user.

13. The method as claimed in claim 12, wherein the real image is at least partially coincident with the virtual image.

* * * * *